United States Patent
Filgas et al.

(10) Patent No.: US 9,236,703 B2
(45) Date of Patent: Jan. 12, 2016

(54) LASER SYSTEM AND METHOD FOR PRODUCING A LINEARLY POLARIZED SINGLE FREQUENCY OUTPUT USING POLARIZED AND NON-POLARIZED PUMP DIODES

(75) Inventors: David M. Filgas, Newbury Park, CA (US); N. Peter Davis, Redondo Beach, CA (US); Matthew J. Klotz, Pasadena, CA (US); Victor Leyva, Pasadena, CA (US); Robert Stultz, Cypress, CA (US); Juan Carlos Sotelo, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 74 days.

(21) Appl. No.: 13/290,853

(22) Filed: Nov. 7, 2011

(65) Prior Publication Data
US 2013/0114627 A1 May 9, 2013

(51) Int. Cl.
| | |
|---|---|
| *H01S 3/11* | (2006.01) |
| *H01S 3/06* | (2006.01) |
| *H01S 3/10* | (2006.01) |
| *H01S 3/106* | (2006.01) |
| *H01S 3/094* | (2006.01) |
| *H01S 3/0941* | (2006.01) |
| *H01S 3/113* | (2006.01) |

(Continued)

(52) U.S. Cl.
CPC .......... *H01S 3/0627* (2013.01); *H01S 3/094084* (2013.01); *H01S 3/10061* (2013.01); *H01S 3/1061* (2013.01); *H01S 3/08031* (2013.01); *H01S 3/09415* (2013.01); *H01S 3/094053* (2013.01); *H01S 3/113* (2013.01); *H01S 3/1611* (2013.01); *H01S 3/1643* (2013.01)

(58) Field of Classification Search
CPC ................. H01S 3/0621; H01S 3/0627; H01S 3/094049; H01S 3/094053; H01S 3/094084; H01S 3/113
USPC ........................................................ 372/10, 11
See application file for complete search history.

(56) References Cited

U.S. PATENT DOCUMENTS

| | | | |
|---|---|---|---|
| 5,497,388 A * | 3/1996 | Goto et al. ...................... 372/22 |
| 6,931,047 B2 * | 8/2005 | Kan et al. ......................... 372/69 |
| 2004/0076212 A1 * | 4/2004 | Nunokawa et al. ............. 372/70 |

(Continued)

OTHER PUBLICATIONS

Schmitt et al. ("Design and performance of a high-repetition rate single-frequency Yb:YAG microlaser", Proc. SPIE 6871, Solid State Lasers XVII: Technology and Devices, 687105 (Feb. 7, 2008)).*

(Continued)

*Primary Examiner* — Tod T Van Roy

(57) ABSTRACT

A laser system comprises a pump diode, fiber, relay optics, and a microchip laser crystal. The pump diode produces light at a first wavelength. The fiber receives the light from the pump diode and produces a round, homogeneous light spot at an output of the fiber. The relay optics receives the light from the fiber. The microchip laser crystal receives the light from the relay optics and produces a linearly polarized single frequency output at a second wavelength. The microchip laser crystal includes a first layer and a second layer. The first layer absorbs the light at the first wavelength and emits light at the second wavelength. The second layer receives the light at the second wavelength and either provides a polarization dependent loss at the second wavelength or maintains a polarization of the light at the second wavelength.

20 Claims, 1 Drawing Sheet

(51) Int. Cl.
*H01S 3/16* (2006.01)
*H01S 3/08* (2006.01)

(56) References Cited

U.S. PATENT DOCUMENTS

2006/0245680 A1* 11/2006 Rasmussen et al. ............ 385/11
2009/0016385 A1* 1/2009 Sakai et al. ...................... 372/11
2010/0215069 A1* 8/2010 Otsuka ............................ 372/41

OTHER PUBLICATIONS

Y. Wang, et al., "Stable polarization short pulse passively Q-switched monolithic microchip laser with [110] cut Cr4+:YAG", Laser Phys. Lett. 6, No. 11, 2009, p. 788-790.

G.J. Spuhler, et al., "Experimentally confirmed design guidelines for passively Q-switched microchip lasers using semiconductor saturable absorbers", J. Opt. Soc. Am. B/vol. 16, No. 3, Mar. 1999, p. 376-388.

Adelbert Owyoung, et al., "Stress-induced tuning of a diode-laser-excited monolithic Nd:YAG laser", Optics Letter, vol. 12, No. 12, Dec. 1987, p. 999-1001.

J.J. Zayhowski, et al., "Miniature Solid-State Lasers" Aug. 25, 2006, 143 pages.

J.J. Zayhowski, "Microchip Lasers", The Lincoln Labortory Journal, vol. 3, No. 3, 1990, p. 427-446.

J.J. Zayhowski, et al., "Diode-pumped passively Q-switched picosecond microchip lasers", Optics Letters, vol. 19, No. 18, Sep. 15, 1994, p. 1427-1429.

J.J. Zayhowski, et al., "Single-frequency microchip Nd lasers", Optics Letters, vol. 14, No. 1, Jan. 1, 1989, p. 24-26.

J.J. Zayhowski, et al., "Frequency-modulated Nd:YAG microchip lasers", Optics Letters, vol. 14, No. 12, Jun. 15, 1989, p. 618-620.

Partial European Search Report dated Dec. 20, 2012 in connection with European Patent Application No. EP 12 18 3188.

H. Sakai, et al., "Polarization stabilizing for diode-pumped passively Q-switched Nd: YAG microchip lasers", Jan. 29, 2006, 3 pages.

N. MacKinnon, et al., "A laser diode array pumped, Nd:YVO4/KTP, composite material microchip laser", Optics Communications, vol. 105, No. 3-4, Feb. 1, 1994, p. 183-187.

Kangin Lee, et al., "Pump laser effect on temporal jittering of pulses from passively Q-Switched Nd:YVO4 laser", Feb. 11, 2010, 8 pages.

European Search Report dated Apr. 15, 2013 in connection with European Patent Application No. EP 12 18 3188.

* cited by examiner

LASER SYSTEM AND METHOD FOR PRODUCING A LINEARLY POLARIZED SINGLE FREQUENCY OUTPUT USING POLARIZED AND NON-POLARIZED PUMP DIODES

GOVERNMENT RIGHTS

This invention was made with U.S. Government support under contract number NNG09CP09C. The U.S. Government may have certain rights in this invention.

TECHNICAL FIELD

The present disclosure is directed, in general, to lasers, and more specifically, to a laser system producing a linearly polarized single frequency output using polarized and non-polarized pump diodes.

BACKGROUND OF THE DISCLOSURE

A variety of laser configurations are known. However, some of these include components that unnecessarily increase complexity for particular configurations. Further, some laser configurations have an unacceptable timing jitter.

SUMMARY OF THE DISCLOSURE

To address one or more of the above deficiencies of the prior art, one embodiment of the disclosure provides a laser system that comprises a laser diode, fiber, relay optics, and a microchip laser crystal. The laser diode is configured to produce light at a first wavelength. The fiber, coupled to the laser diode, is configured to receive the light from the laser diode and to produce a round, homogeneous light spot at an output of the fiber. The relay optics are configured to receive the light from the fiber. The microchip laser crystal is configured to receive the light from the relay optics and to produce a linearly polarized single frequency output at a second wavelength. The microchip laser crystal includes a first layer and a second layer. The first layer is configured to receive the light at the first wavelength and to convert the light from the first wavelength to the second wavelength. The second layer is configured to provide a polarization dependent loss at the second wavelength.).

Certain embodiments of the disclosure may provide numerous technical advantages. For example, a technical advantage of one embodiment is the capability to provide a single frequency operation at 1064 nm without external wavelength selective optics. A technical advantage of another embodiment is the capability to provide a linearly polarized laser output without the need for an additional bleaching diode and its driver. Yet another technical advantage of another embodiment is the capability to provide a linearly polarized laser output using an unpolarized pump input. Still yet another technical advantage of other embodiment is the capability to enable remote locations for a fiber coupled pump because a short fiber length is not required. Still yet another technical advantage of another embodiment is the capability to produce relatively low timing jitter in combination with pump modulation techniques.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

In particular configurations, it may be desirable to have a linearly polarized single frequency output for a laser. For polarization control of the laser output, conventional configurations may use so-called "bleaching" diodes in addition to a pump laser diode. Additionally, to obtain a single frequency, some configurations utilize wavelength selective optics.

Recognizing that such additional components may be undesirable for certain configurations, certain embodiments teach components in a laser system that yield linearly polarized single frequency outputs without utilization of external wavelength selective optics. Additionally, certain embodiments teach components that yield linearly polarized single frequency outputs without additional bleaching diodes. Further, certain embodiments produce relatively low timing jitter through a combination of pump diode pulsing techniques.

Figure 1:
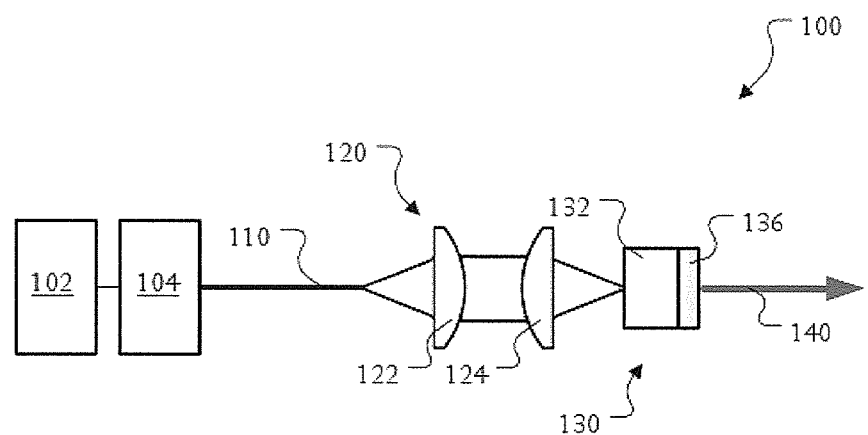
FIG. 1 illustrates a laser system, according to an embodiment of the disclosure.

FIG. 1 illustrates a laser system 100, according to an embodiment of the disclosure. Although certain details will be provided with reference to the components of the laser system 100 of FIG. 1, it should be understood that other embodiments may include more, less, or different components. The laser system 100 of FIG. 1 includes a driver 102, a pump diode 104, fiber 110, relay optics 120, and a microchip laser crystal 130. As described in more detail below, the laser system 100 in this embodiment is configured to generate a linearly polarized single frequency output 140.

The driver 102 in the embodiment of FIG. 1 is configured to drive the pump diode 104, which in this embodiment produces moderately linearly polarized energy, light, or electromagnetic radiation ("energy, light, or electromagnetic radiation" hereinafter referred to as "light"). In particular configurations, the driver 102 may produce either a continuous light wave or a pulsed light wave from the pump diode 104. Additionally, in particular configurations, the driver 102 may modulate the pump diode 104, for example, in producing the pulsed light wave. In particular configurations the pump diode 104 may produce light (pulsed or not) at a wavelength of 808 nm. In other embodiments, depending on the desired output of the laser system 100, the pump diode 104 may produce wavelengths of greater than 808 nm or less than 808 nm.

The pump diode 104 is shown coupled to the fiber 110. In particular configurations, it may be desirable to have a polarized pump light input into the microchip laser crystal 130, for example, where the microchip laser crystal maintains the polarization of the incoming light. At the same time, it may be desirable to have a light spot fed into the microchip laser crystal 130 that is round and homogeneous as opposed to square with varying light intensity. Moreover, due to potential power requirements for the output of the laser (e.g., up to ten Watts or more), multimode fibers as opposed to single mode fibers may need to be utilized. With such dual desires in multimode fibers, a conflict may arise. Generally, a multimode fiber having a longer length will produce a more homogenous light spot, but at the cost of a higher degree of depolarization. Conversely, a shorter multimode fiber will better maintain the polarization of the input light, but at the potential cost of reduced homogenization. Accordingly, certain embodiments recognize an optimized configuration for a multimode fiber that can produce a round homogenous light spot at its output while maintaining the polarization of the light from the pump diode 104.

In particular embodiments, to have polarized pump light with a round, homogenous output, the ratio of the length of the fiber to the diameter of the fiber may be configured. For example, on the low end, the ratio of the length to the diameter may be 10 to 1. On the upper end, the ratio of the length to the diameter may be 1000 to 1. Any other ratios may be utilized between the two, including, for example, a ratio of the length to the diameter of 100 to 1. As one example, in particular configurations, the fiber 110 may be less than 10 cm with the diameter corresponding to the above ranges. In other configurations, the fiber 110 may be 10 cm or more. In certain configurations, the fiber 110 may also be straight to further maintain a polarization of the light from the pump diode 104.

In particular configurations, shorter length fibers (relative to their diameter) may produce a light output having a polarization of greater than 90% of the light. At slightly longer distances (with the same diameter), polarization may be greater than 80% of the light. In particular configurations, 80% polarization may be acceptable whereas in other configurations, a polarization of greater than 90% may be desired.

As an alternative to the above-referenced short length multimode fiber, other configurations of the fiber 110 may be a polarization maintaining fiber designed to maintain the polarization of the light being transmitted therethrough. In such configurations, the length of the fiber 110 may be less of a concern.

Again, as referenced above, in addition to maintaining the polarization of the light, the fiber 110 may also produce a round, homogeneous light spot at its output. In particular configurations, such a round, homogeneous light spot may be desirable.

The fiber 110 is coupled to the relay optics 120. The relay optics 120 in particular configurations may transfer the round, homogeneous, light spot from the fiber 110 intact to the microchip laser crystal 130. One of ordinary skill in the art will recognize the details of the relay optics 120; accordingly, the details will not be explained. As recognized by one of ordinary skill in the art, relay optics 120 may include, among other components, lenses 122 and 124 to focus the light being transmitted therethrough.

The polarized light from the relay optics 120 is passed to the microchip laser crystal 130 at a wavelength of 808 nm. The microchip laser crystal 130 in this embodiment includes two layers—a gain layer 132 and a saturable absorption layer 136. The gain layer 132 in this particular embodiment is an isotropic gain medium such as, but not limited to, neodymium-doped yttrium aluminum garnet (Nd:YAG). Other embodiments may utilize other gain media and may depend on the desired output from the laser 100. The saturable absorption layer 132 in this particular embodiment is an anisotropic material such as, but not limited to, chromium4+-doped yttrium aluminum garnet (Cr:YAG).

The gain layer 132 absorbs the pump light and emits light at the laser system's output wavelength as will be recognized by one of ordinary skill in the art after reading this disclosure. For example, the gain layer 132 may absorb the 808 nm pump light and emit light at a wavelength of 1064 nm.

The saturable absorption layer 136 in this embodiment is a saturable absorber, which in particular embodiments may serve as a Q-switch and provide nano-second length pulses. As recognized by one of ordinary skill in the art, Q-switches may produce pulses regardless of whether the pumplight is pulsed or a continuous. The saturable absorption layer 136 may also provide a polarization dependent loss yielding polarized laser output as a result of its anisotropic characteristics.

In particular embodiments, the microchip laser crystal 130 may have a relatively short cavity length, for example, 2 mm or less. Such a short cavity length may allow a single frequency output from the laser system 100. In other embodiments, the cavity length of the microchip laser crystal 130 may be more than 2 mm.

The short cavity length of the microchip laser crystal 130 (approximately 2 mm) in combination with the narrow gain bandwidth of Nd:YAG gain layer 132 yields a single frequency of the linearly polarized single frequency output 140, which consists of laser pulses at 1064 nm. The combination of the polarized pump diode 104, the polarization maintaining properties of the fiber 110, and the anisotropic properties of the saturable absorption layer 136 enable linearly polarized single frequency output 140.

In other embodiments, the microchip laser crystal 130 could include a longer cavity length, for example, in configurations where multiple frequencies were desired.

In particular embodiments, the laser pulses of the linearly polarized single frequency output 140 may be produced with a continuous wave pump diode 104, for example, by using the Q-switch functionality of the saturable absorption layer 136. In other embodiments, the pump diode 104 may be modulated or pulsed (e.g., as may be caused by the driver 102) between a threshold value and a nominal value. In particular embodiments, the modulation of the pump diode 104 in combination with the Q-switch functionality of the saturable absorption layer 136 may provide a relatively low timing jitter of less than +/−3 microseconds for the pulses. This allows the pulse repetition frequency to be synchronized with an external reference frequency.

Figure 2:
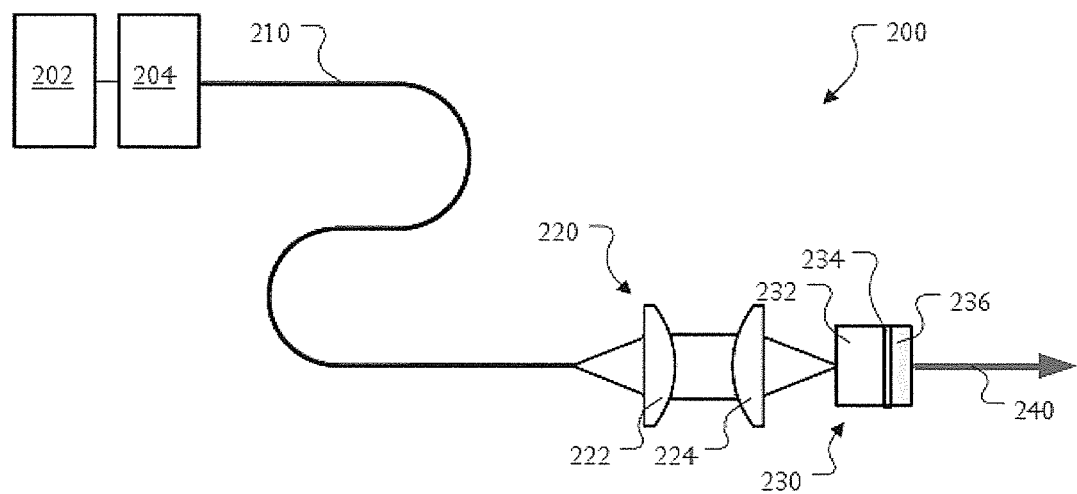
FIG. 2 illustrates a laser system, according to another embodiment of the disclosure.

FIG. 2 illustrates a laser system 200, according to another embodiment of the disclosure. Similar to FIG. 1, although certain details will be provided with reference to the components of the laser system 200 of FIG. 2, it should be understood that other embodiments may include more, less, or different components. The laser system 200 of FIG. 2 includes similar component parts to the laser system 100 of FIG. 1, namely a driver 202, a pump diode 204, fiber 210, relay optics 220, and a microchip laser crystal 230. As described in more detail below, the laser system 200 in this embodiment is configured to generate a linearly polarized single frequency output 240.

The driver 202 and the pump diode 204 of FIG. 2 may have similar features and functionality to the driver 102 and the pump diode 104 of FIG. 1. However, the pump diode 204 of FIG. 2 may produce unpolarized light as opposed to the moderately linearly polarized light from the pump diode 104 of FIG. 1.

The pump diode 204 is coupled to the fiber 210. The fiber 210 of FIG. 2 may have similar features to the fiber 110 of FIG. 1, including a round, homogeneous light spot at its output. However, the fiber 210 may be a multimode fiber that has a virtually unlimited length because, in this embodiment, the fiber 210 does not necessarily need to maintain a polarization of the light being transmitted therethrough.

The fiber 210 is coupled to the relay optics 220, which in a manner similar to the relay optics 120 of FIG. 1, may transfer the round, homogeneous, light spot from the fiber 210 intact to the microchip laser crystal 230. One of ordinary skill in the art will recognize the details of the relay optics 220; accordingly, the details will not be explained. As recognized by one of ordinary skill in the art, relay optics 220 may include, among other components, lenses 222 and 224 to focus the light being transmitted therethrough.

The light from the relay optics 220 is passed to the microchip laser crystal 230 at a wavelength of 808 nm. The microchip laser crystal 230 in this embodiment includes three layers—a gain layer 232, a saturable absorption layer 236, and an interfacial dichroic coating 234 sandwiched between the gain layer 232 and the saturable absorption layer 236.

Both the gain layer 232 and the saturable absorption layer 236 may be made of similar materials and have similar functions to the gain layer 132 and the saturable absorption layer 136 of FIG. 1. For example, the gain layer 232 in this particular embodiment is an isotropic gain medium such as, but not limited to, neodymium-doped yttrium aluminum garnet (Nd: YAG). Other embodiments may utilize other gain media and may depend on the desired output from the laser 200. The gain layer 232 absorbs the pump light and emits light at the laser system's output wavelength in a manner recognized by one of ordinary skill in the art. For example, the gain layer 232 may absorb 808 nm pump light and emit a wavelength of 1064 nm.

The saturable absorption layer 236 may be an anisotropic material such as, but not limited to, chromium4+:doped yttrium aluminum garnet (Cr:YAG). The saturable absorption layer 236 in this embodiment may serve as a Q-switch and provide nano-second length pulses. As recognized by one of ordinary skill in the art, Q-switching may produce pulses regardless of whether the pump light is pulsed or continuous. Further, the saturable absorption layer 236 may select a provide a polarization dependent loss which determines the laser's output polarization.

The interfacial dichroic coating 234 is configured to reflect the pump wavelength and let the laser's output wavelength pass therethrough. For example, the interfacial dichroic coating 234 may be highly reflective at 808 nm and antireflective at 1064 nm. To carry out this functionality, any suitable material may be utilized including, but not limited to, layers of silicon oxide and metallic oxides.

In operation, the interfacial dichroic coating 234 reflects residual pump light from the diode 204, preventing the pump light not absorbed by the gain medium from reaching the saturable absorber layer. If it were not blocked by the interfacial dichroic coating 234, the unabsorbed pump light could modify the polarization dependent loss of the saturable absorber resulting in variations in the polarization of the laser output. Blocking the unabsorbed pump light at the interfacial dichroic coating allows the polarization dependent loss of the saturable absorption layer 236 to determine polarization of the laser output. As will be recognized by one of ordinary skill in the art, multiple different polarizations of the light may be introduced into the saturable absorption layer 236 and bounce back and forth between the leftmost surface of 232 and the rightmost surface of 236. The polarization of the light with the lowest losses will create the output 240. The lowest losses depend on the orientation of the anisotropic saturable absorption layer 236. Thus, the saturable absorption layer 236 with its anisotropic properties selects the polarization of the linearly polarized single frequency output 240, which has a frequency of 1064 nm according to this embodiment.

In particular embodiments, the microchip laser crystal 230 may have a relatively short cavity length, for example, 2 mm or less. The short cavity length of the microchip laser crystal 230 (approximately 2 mm) in combination with the narrow gain bandwidth of Nd:YAG gain layer 232 yields a single frequency of the linearly polarized single frequency output 240, which is lased pulses at 1064 nm. The combination of the interfacial dichroic coating 234 and the anisotropic properties of the saturable absorption layer 236 allows the 1064 nm laser output pulses to be linearly polarized and single frequency.

In other embodiments, the microchip laser crystal 230 could include a longer cavity length, for example, in configurations where multiple frequencies were desired.

Similar to the description with reference to FIG. 1, in particular embodiments, the laser pulses of the linearly polarized single frequency output 240 may be produced with a continuous wave of light, for example, by using the Q-switch functionality of the saturable absorption layer 236. In other embodiments, the pump diode 204 may be modulated or pulsed (e.g., as may be caused by the driver 202) between a threshold value and a nominal value. In particular embodiments, the modulation of the pump diode 204 in combination with the Q-switch functionality of the anisotropic layer 236 may provide a relatively low timing jitter of less than +/−3 microseconds for the pulses. This allows the pulse repetition frequency to be synchronized with an external reference frequency.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A laser system comprising:
    a microchip laser crystal configured to receive non-polarized light at a first wavelength and to produce a linearly polarized single frequency output at a second wavelength, the microchip laser crystal including:
        a first layer configured to absorb light at the first wavelength and to emit light at the second wavelength;
        a second layer configured to receive the light at the second wavelength and to provide a polarization dependent loss at the second wavelength, the second layer comprising a saturable absorption layer configured to operate as a Q-switch to pulse the linearly polarized single frequency output; and
        a third layer positioned between the first layer and the second layer, the third layer configured to reflect the light at the first wavelength that is not absorbed by the first layer to reduce variations in the polarization dependent loss at the second wavelength;

a pump diode configured to produce the light at the first wavelength;

a multimode fiber configured to receive the light at the first wavelength from the pump diode and produce a round homogenous light spot to be input to the microchip laser crystal; and a driver configured to modulate the pump diode;

wherein a ratio of a length of the multimode fiber to a diameter of the multimode fiber is between approximately 100 to 1 and 1000 to 1.

2. The laser system of claim 1, further comprising:

relay optics comprising one or more lenses, the relay optics configured to transfer the light from the multimode fiber to the microchip laser crystal.

3. The laser system of claim 1, wherein:

the driver is configured to modulate the pump diode such that the light at the first wavelength produced by the pump diode is pulsed; and the laser system is configured to coordinate the modulation of the pump diode with the operation of the Q-switch to provide a timing jitter of less than ±3 microseconds.

4. The laser system of claim 1, wherein the second layer is chromium (IV)-doped yttrium aluminum garnet (Cr:YAG).

5. The laser system of claim 1, wherein the third layer is configured to allow the polarization dependent loss of the second layer to determine the polarization of the linearly polarized single frequency output.

6. The laser system of claim 1, wherein the microchip laser crystal has a cavity length of approximately 2 mm or less.

7. A laser system comprising:

a pump diode configured to produce linearly polarized light at a first wavelength;

a driver configured to drive the pump diode;

a multimode fiber configured to receive the light from the pump diode and maintain the linear polarization of the light;

relay optics configured to receive the light from the multimode fiber; and a microchip laser crystal configured to receive the maintained polarized light from the multimode fiber and to further maintain the linear polarization of the light to provide a linearly polarized single frequency output, the microchip laser crystal including:

a first layer configured to absorb the light at the first wavelength and to emit light at a second wavelength, and a second layer configured to receive the light at the second wavelength and to provide a polarization dependent loss at the second wavelength through at least the further maintenance of the linear polarization of the light, the second layer comprising a saturable absorption layer configured to operate as a Q-switch to pulse the linearly polarized single frequency output;

wherein a ratio of a length of the multimode fiber to a diameter of the multimode fiber is between approximately 100 to 1 and 1000 to 1.

8. The laser system of claim 7, wherein the laser system includes no laser diodes other than the pump diode.

9. The laser system of claim 7, wherein the second layer is chromium4+:doped yttrium aluminum garnet (Cr:YAG).

10. The laser system of claim 7, wherein the fiber is configured to produce a light output having a polarization of greater than eighty percent of the light.

11. The laser system of claim 7, wherein the fiber is configured to produce a light output having a polarization of greater than ninety percent of the light.

12. The laser system of claim 7, wherein the microchip laser crystal has a cavity length of approximately 2 mm or less.

13. A laser system comprising:

a pump diode configured to produce linearly polarized light at a first wavelength;

a driver configured to modulate the pump diode such that the light at the first wavelength produced by the pump diode is pulsed;

a fiber configured to receive the light from the pump diode and maintain the linear polarization of the light;

relay optics configured to receive the light from the fiber; and a microchip laser crystal configured to receive the maintained polarized light from the fiber and to further maintain the linear polarization of the light to provide a linearly polarized single frequency output, the microchip laser crystal including:

a first layer configured to absorb the light at the first wavelength and to emit light at a second wavelength, and a second layer configured to receive the light at the second wavelength and to provide a polarization dependent loss at the second wavelength through at least the further maintenance of the linear polarization of the light, the second layer comprising a saturable absorption layer configured to operate as a Q-switch to pulse the linearly polarized single frequency output;

wherein the laser system is configured to coordinate the modulation of the pump diode with the operation of the Q-switch to provide a timing jitter of less than ±3 microseconds; and wherein the fiber comprises a multimode fiber configured to produce a round homogenous light spot.

14. The laser system of claim 13, wherein a ratio of a length of the multimode fiber to a diameter of the multimode fiber is between approximately 100 to 1 and 1000 to 1.

15. A method of producing a linearly polarized single frequency output, the method comprising:

producing light at a first wavelength;

receiving the light at the first wavelength at a multimode fiber and producing a round, homogeneous light spot at an output of the multimode fiber;

receiving, at a microchip laser crystal, the light at the first wavelength; and producing, using the microchip laser crystal, the linearly polarized single frequency output at a second wavelength, wherein producing the linearly polarized single frequency output includes:

absorbing, in a first layer, the light at the first wavelength, emitting, from the first layer, light at the second wavelength, providing, in a second layer, a polarization dependent loss at the second wavelength and pulsing the linearly polarized single frequency output, the second layer comprising a saturable absorption layer configured to operate as a Q-switch; and reflecting, with a third layer positioned between the first layer and the second layer, the light at the first wavelength that is not absorbed by the first layer, the reflected light reducing variations in the polarization dependent loss at the second wavelength;

wherein a ratio of a length of the multimode fiber to a diameter of the multimode fiber is at least approximately 100 to 1.

16. The method of claim 15, wherein the light at the first wavelength is not linearly polarized.

17. The method of claim 15, further comprising modulating the light at the first wavelength such that the light at the first wavelength is pulsed;
wherein the modulation of the light at the first wavelength is coordinated with the operation of the Q-switch to provide a timing jitter of less than ±3 microseconds.

18. The method of claim 15, wherein the third layer allows the polarization dependent loss of the second layer to determine the polarization of the linearly polarized single frequency output.

19. A method of producing a linearly polarized single frequency output, the method comprising:
modulating light at a first wavelength such that the light is pulsed, wherein the light at the first wavelength is linearly polarized;
receiving the light at the first wavelength at a fiber and producing a round, homogeneous light spot at an output of the fiber;
maintaining the linear polarization of the light in the fibers;
receiving, at a microchip laser crystal, the light at the first wavelength; and
producing, using the microchip laser crystal, the linearly polarized single frequency output at a second wavelength, wherein producing the linearly polarized single frequency output includes:
absorbing, in a first layer, the light at the first wavelength,
emitting, from the first layer, light at the second wavelength,
providing, in a second layer, a polarization dependent loss at the second wavelength and pulsing the linearly polarized single frequency output, the second layer comprising a saturable absorption layer configured to operate as a Q-switch; and
reflecting, with a third layer positioned between the first layer and the second layer, the light at the first wavelength that is not absorbed by the first layer, the reflected light reducing variations in the polarization dependent loss at the second wavelength;
wherein the modulation of the light at the first wavelength is coordinated with the operation of the Q-switch to provide a timing jitter of less than ±3 microseconds.

20. The method of claim 19, wherein the fiber maintains the linear polarization by having a length less than ten centimeters and relatively few bends.

* * * * *